United States Patent [19]

Boen

[11] 4,084,653
[45] Apr. 18, 1978

[54] PROTECTIVE GUARD ARRANGEMENT FOR TRACK DRIVE MOTORS

[75] Inventor: Charles G. Boen, Montgomery, Ill.

[73] Assignee: Caterpillar Tractor Co., Peoria, Ill.

[21] Appl. No.: 788,873

[22] Filed: Apr. 19, 1977

[51] Int. Cl.² ............................................. B62D 55/00
[52] U.S. Cl. .................................................. 180/9.48
[58] Field of Search ..................... 180/9.48, 5 R, 89.1, 180/84

[56] References Cited

U.S. PATENT DOCUMENTS

| | | | |
|---|---|---|---|
| 3,712,398 | 1/1973 | Althaus | 180/9.48 |
| 3,930,549 | 1/1976 | Griffith | 180/9.48 |

*Primary Examiner*—Philip Goodman
*Attorney, Agent, or Firm*—John W. Grant

[57] ABSTRACT

A crawler type vehicle has a car body, a pair of track roller frames connected to the car body and a pair of drive motors each being attached to a respective roller frame. Each of the roller frames are movable between first and second positions at which the roller frame and associated drive motor are a minimum and maximum distance respectively from a longitudinal axis of the vehicle. A first guard assembly is fastened to the car body and is of a construction sufficient for substantially encompassing the drive motors at the first position of the roller frames and for encompassing at least the distal end portions of the drive motors at the second position of the roller frames. A pair of second guard assemblies is mounted on a respective roller frame and movable therewith when the roller frame is moved between the first and second positions. Each second guard assembly is of a construction sufficient for encompassing the proximal end portion of the associated drive motor and for telescopically extending into the first guard assembly at the first position of the roller frame.

4 Claims, 3 Drawing Figures

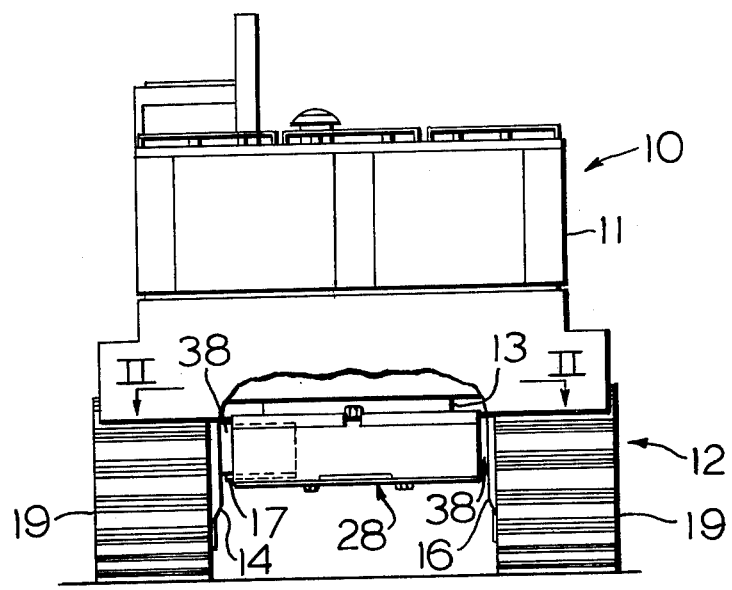
Fig-1-
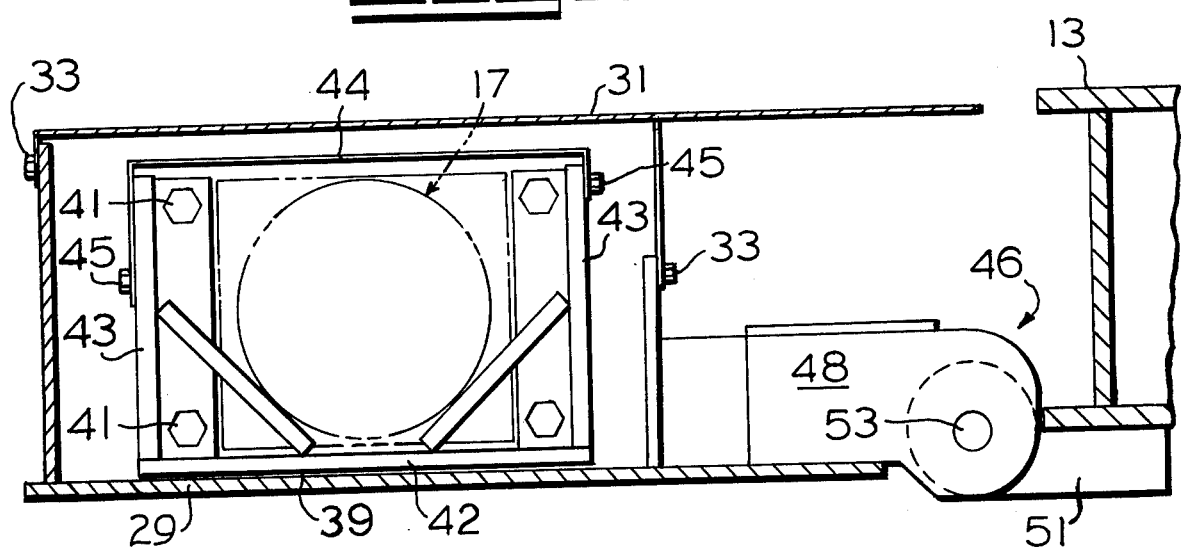
Fig-3-

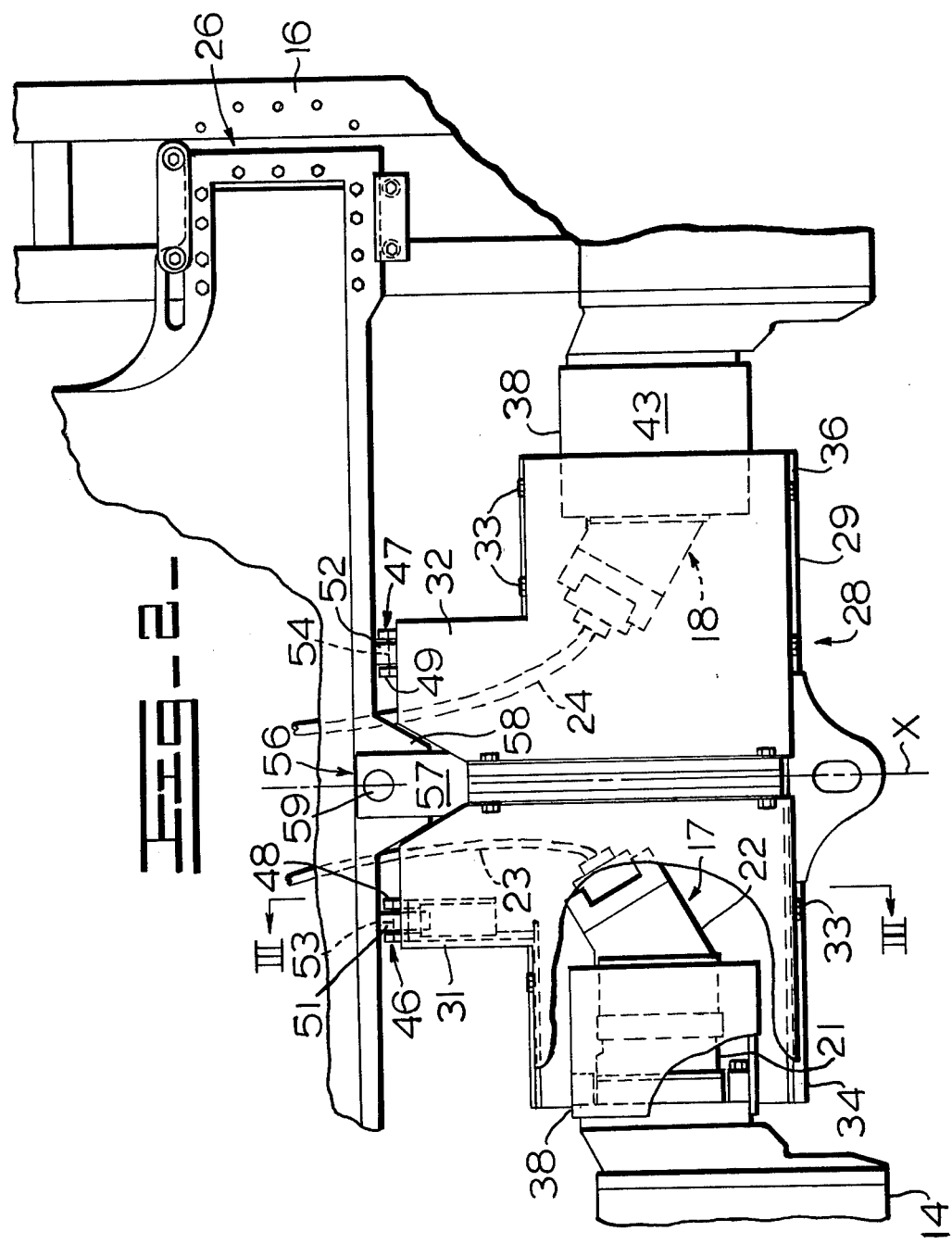

PROTECTIVE GUARD ARRANGEMENT FOR TRACK DRIVE MOTORS

BACKGROUND OF THE INVENTION

Some hydraulic excavators having hydraulic drive motors attached to the roller frames for driving the tracks are provided with a guard assembly to substantially enclose the drive motors. The present guard assemblies are attached solely to the car body. However, many of the hydraulic excavators are provided with a means to move the roller frames and tracks outwardly relative to the longitudinal axis of the vehicle to provide a wider track gauge. Moving the roller frames outwardly also moves the drive motors outwardly from the guard assembly thereby exposing at least a portion of each drive motor to potential damage by their impact with rocks, stumps or the like.

SUMMARY OF THE INVENTION

The present invention is directed to overcoming one or more of the problems as set forth above.

According to the present invention there is provided a crawler type vehicle of the type movable along a longitudinal axis and having a car body, a pair of roller frames connected to the car body, and a pair of drive motors each being attached to a respective roller frame and each having proximal and distal end portions. Each of said roller frames is movable between a first position at which the roller frame and associated drive motor are maintained a minimum distance from the longitudinal axis and a second position at which the roller frame and associated drive motor are maintained at a maximum distance from the longitudinal axis. A first guard assembly is fastened to said car body and being of a construction sufficient for substantially encompassing said drive motors when the roller frames are at the first position and for encompassing at least the distal end portions of the drive motors when the roller frames are at the second position. A pair of second guard assemblies are each mounted on a respective roller frame and movable therewith when the roller frame is moved between the first and second positions, each of said second guard assemblies being of a construction sufficient for encompassing the proximal end portion of the associated drive motor and for telescopically extending into the first guard assembly when the roller frame is at the first position.

BRIEF DESCRIPTION OF THE DRAWINGS

FIG. 1 is a diagrammatic rear view of a crawler type vehicle upon which this invention can be utilized;

FIG. 2 is an enlarged top plan view of the guard arrangement and protected motors, taken in the direction of arrow II—II in FIG. 1; and FIG. 3 is an enlarged cross sectional view through the guard arrangement taken along line III—III of FIG. 2.

DETAILED DESCRIPTION OF THE INVENTION

Referring to FIG. 1, a crawler type vehicle, such as a hydraulic excavator 10 has an upper unit 11 rotatably connected to an undercarriage 12 in the usual manner. The vehicle is movable along its longitudinal axis indicated at X in FIG. 2. The undercarriage has a car body 13 and a pair of roller frames 14, 16 connected to and positioned along opposed sides of the car body. A pair of drive motors 17, 18 are each connected to a respective roller frame for driving a continuous track 19 associated with each roller frame. Each of the drive motors has a proximal end portion 21 and a distal end portion 22. Conduits 23, 24 are connected to the distal end portions of the motors for selectively communicating pressurized hydraulic fluid thereto in the usual manner.

Referring to FIG. 2, the roller frames 14, 16 are each connected to the car body 13 by a pair of adjustment means, one shown at 26. The adjustment means permits each roller frame to be selectively moved from a first position at which the roller frame and associated drive motor are at a minimum distance from the longitudinal axis and a second position at which the roller frame and associated drive motor are at a maximum distance from the longitudinal axis. FIG. 2 illustrates the relative positions of drive motor 17, 18 when the leftward roller frame is disposed at the first position relative to the londitudinal axis X and the rightward roller frame is disposed at the second position relative to the longitudinal axis. The above-described basic elements are all well known in the art.

Referring to FIGS. 2 and 3, a first guard assembly 28 is detachably connected to the rearward portion of the car body 13 and is of a construction sufficient for substantially encompassing the drive motors 17, 18 when the roller frames 14, 16 are at the first position and for encompassing at least the distal end portion 22 of the drive motors when the roller frames are at the second position.

The first guard assembly includes a lower plate assembly 29 and a pair of cover plates 31, 32 connected to the lower plate assembly by a plurality of bolts 33. The lower plate assembly is fabricated from numerous plates and reinforcing members secured together as by welding and forms a pair of laterally extending portions 34, 36 each having a substantially U-shaped cross section and each underlying a respective drive motor 17, 18. Each of the cover plates is fastened to a respective laterally extending portion forming a rectangular-shaped opening into which the drive motors extend. The cover plates and the lower plate assembly also cooperate to form a pair of openings which are open at the forward end adjacent to the car body for the conduits 23, 24 to extend therethrough.

A pair of second guard assemblies 38 are each mounted on a respective roller frame 14, 16 and movable therewith when the roller frame is moved between the first and second positions. Each of the second guard assemblies is of a construction sufficient for encompassing the proximal end portion 21 of the associated drive motor 17, 18 and for extending into the rectangular opening of the first guard assembly when the roller frame is at the first position.

Each of the second guard assemblies include a lower plate assembly 39 fastened to the respective roller frame by a plurality of bolts 41. The lower plate assembly has a bottom plate 42 positioned in underlying relation to the proximal end portion 21 of the respective drive motor and a pair of vertical plates 43 secured to the bottom plates and disposed on opposite sides of the drive motor. A cover plate 44 is secured to the upper portion of the vertical plates by a plurality of bolts 45. The lower plate assembly and cover cooperate to completely enclose the proximal end portion of the respective drive motor.

First and second pin connections 46, 47 are provided to detachably fasten the first guard assembly to the car body. First and second bifurcated brackets 48, 49 are secured to and extend forwardly from the lower portion of the lower plate assembly 29, each bracket being spaced laterally from the longitudinal axis X. First and second lugs 51, 52 are secured to the car body 13 and extend rearwardly therefrom to mate with the first and second brackets. The lugs are connected to the mounting brackets by first and second hinge pins 53, 54 which are horizontally disposed.

A third pin connection 56 includes a bracket 57 secured to the upper portion of the car body 13 and is connected to a protruding portion 58 of the car body by a third pin 59. The third pin is vertically disposed and is positioned on the longitudinal axis.

By first removing the cover plates 31, 32 and then the third pin 59, the lower plate assembly 29 can pivot about the first and second pins to provide access for servicing the drive motors and associated components.

The first guard assembly and the second guard assemblies are each constructed to withstand impact with rocks, stumps or the like and prevent damage to the drive motors. Moreover, since there is no physical contact between the first guard assembly and either of the second guard assemblies, slight deflections in one of the guard assemblies will not be transmitted to the other guard assembly.

Other aspects, objects and advantages will become apparent from a study of the drawings, the disclosure, and the appended claims.

The embodiments of the invention in which an exclusive property or privilege is claimed are defined as follows:

1. In a crawler type vehicle of the type movable along a longitudinal axis and having a car body, a pair of roller frames connected to the opposed sides of the car body, and a pair of drive motors each being connected to a respective roller frame and each having proximal and distal end portions, each of said roller frames being movable between a first position at which the roller frame and associated drive motor are at a minimum distance from the longitudinal axis and a second position at which the roller frame and associated drive motor are at a maximum distance from the longitudinal axis, the improvement comprising:

a first guard assembly connected to said car body and being of a construction sufficient for substantially encompassing said drive motors at the first position of the roller frames and for encompassing at least the distal end portions of the drive motors at the second position of the roller frames; and a pair of second guard assemblies each mounted on a respective roller frame and movable therewith during movement of the roller frame between the first and second positions, each of said second guard assemblies being of a construction sufficient for encompassing the proximal end portion of the associated drive motor and for telescopically extending into the first guard assembly at the first position of the roller frame.

2. Apparatus, as set forth in claim 1, wherein each of said second guard assemblies includes a lower plate assembly having a substantially U-shaped cross section, said lower plate assembly being connected to the roller frame underlying the proximal end portion of the respective drive motor, and a cover connected to the lower plate assembly.

3. Apparatus, as set forth in claim 2, wherein the first guard assembly includes a lower plate assembly and a pair of cover plates detachably connected to the cover plate assembly, and including first and second pin connections detachably connecting the lower plate assembly to the car body, each of said pin connections having a pin being generally horizontally disposed and extending laterally relative to said longitudinal axis.

4. Apparatus, as set forth in claim 3, including a third pin connection detachably connecting the lower plate assembly to the car body and having a pin, said pin being vertically disposed and centrally positioned on the longitudinal axis.

* * * * *